(12) United States Patent
Zeng et al.

(10) Patent No.: US 9,026,289 B2
(45) Date of Patent: May 5, 2015

(54) CONTROL METHOD FOR IDLING ANTI-ROLLBACK OF PURE ELECTRIC VEHICLE

(75) Inventors: Qingwen Zeng, Shanghai (CN); Li Lin, Shanghai (CN); Yingqi Zhang, Shanghai (CN)

(73) Assignee: Shanghai Zhongke Shenjiang Electric Vehicle Co., Ltd., Shanghai (CN)

( * ) Notice: Subject to any disclaimer, the term of this patent is extended or adjusted under 35 U.S.C. 154(b) by 46 days.

(21) Appl. No.: 13/823,641

(22) PCT Filed: Jun. 27, 2011

(86) PCT No.: PCT/CN2011/706442
§ 371 (c)(1),
(2), (4) Date: Mar. 14, 2013

(87) PCT Pub. No.: WO2012/055258
PCT Pub. Date: May 3, 2012

(65) Prior Publication Data
US 2013/0197733 A1    Aug. 1, 2013

(30) Foreign Application Priority Data
Oct. 26, 2010    (CN) .......................... 2010 1 0519820

(51) Int. Cl.
*B60L 15/20*    (2006.01)
*B60W 30/18*    (2012.01)

(52) U.S. Cl.
CPC ...... *B60L 15/2081* (2013.01); *B60W 30/18118* (2013.01); *B60L 15/2018* (2013.01); *B60W 2510/186* (2013.01); *B60W 2510/244* (2013.01); *B60W 2540/10* (2013.01); *B60W 2540/12* (2013.01); *B60W 2710/083* (2013.01); *B60Y 2200/91* (2013.01); *B60L 2240/423* (2013.01); *B60L 2250/26* (2013.01); *Y02T 10/642* (2013.01)

(58) Field of Classification Search
USPC .................................................. 701/22; 477/3
See application file for complete search history.

(56) References Cited

U.S. PATENT DOCUMENTS

| | | | |
|---|---|---|---|
| 2009/0048063 A1* | 2/2009 | Silveri et al. ...................... | 477/3 |
| 2009/0093337 A1 | 4/2009 | Soliman et al. | |
| 2009/0233760 A1 | 9/2009 | Silveri et al. | |
| 2009/0299557 A1 | 12/2009 | Farnsworth | |

FOREIGN PATENT DOCUMENTS

| | | |
|---|---|---|
| CN | 101367339 | 2/2009 |
| CN | 101376334 | 3/2009 |
| CN | 101817313 | 9/2010 |
| CN | 101966822 | 2/2011 |

* cited by examiner

Primary Examiner — Mary Cheung
Assistant Examiner — Yuen Wong
(74) Attorney, Agent, or Firm — Avery N. Goldstein, Esq.; Blue Filament Law

(57) ABSTRACT

A control method for idling anti-rollback of a pure electric vehicle is provided, where the pure electric vehicle has a vehicle controller, a motor controller, a motor, a brake pedal, a handbrake device, an accelerator pedal, and a power battery. The method makes use of the differences between a pure electric vehicle from conventional cars, and collects the states of individual parts of the vehicle through the vehicle controller, and controls the output of the torque of the motor based on the state information of various control components, to prevent the vehicle located on a slope from rolling back, and makes the vehicle move forward at idle.

7 Claims, 2 Drawing Sheets

CONTROL METHOD FOR IDLING ANTI-ROLLBACK OF PURE ELECTRIC VEHICLE

FIELD OF TECHNOLOGY

The present invention relates to the technical field of pure electric vehicles, especially to the technical field of idling power control of a pure electric vehicle, and in particular to a control method for idling anti-rollback of a pure electric vehicle.

DESCRIPTION OF RELATED ARTS

A pure electric vehicle is a car whose power source is provided completely by rechargeable batteries (such as lead-acid batteries, nickel cadmium batteries, nickel metal hydride batteries or lithium ion batteries). The advantages of pure electric vehicles are that:

1. There is no pollution, and noise is low;
2. The structure is simple, and easy to use and maintain;
3. The energy conversion efficiency is high; at the same time the energy during braking and going downhill can be recycled, improving the energy utilization efficiency;
4. A pure electric vehicle can be charged at night using the cheap "valley point electricity" of the electric network, and to play the role of stabilizing the peak-valley difference of the electric network.

The use of electric vehicles can effectively reduce the dependence on petroleum resources, and the limited petroleum can be used in more important applications. Electric power used to charge storage batteries can be transformed by energy sources such as coal, natural gas, water power, nuclear energy, solar energy, wind power, tidal energy and so on. In addition, if storage batteries are charged at night, peak power demand can be avoided, which is conducive to balance the load of the electric network and reduces costs. The control of anti-rollback of a traditional vehicle, where the existing vehicle is equipped with an automatic variable transmission that comprises a torque convertor allowing the variable transmission to put and maintain the vehicle in gear even if the vehicle stops or runs on a slope. In a vehicle with a variable transmission that does not have a torque convertor, such as a power shift variable transmission or the manual variable transmission, when the vehicle stops or runs on a slope, the clutch must slide or separate to prevent the vehicle from stalling, therefore the variable transmission cannot transmit torque immediately to wheels.

When a vehicle with no torque converter climbs a positive slope from stopping on the slope, the delay when the torque required to accelerate the vehicle is provided to wheels would cause undesirable vehicle rollback. When a driver presses down the accelerator pedal, known as "stepping on the accelerator pedal" and expects to climb the slope, the control of anti-rollback is needed. If torque is provided by the engine to the wheels to start the vehicle, the delay would occur before the torque is transmitted to the wheels, due to the delay when the combustion air-fuel mixture inflates an inlet manifold and the engine cylinder, and the delay when the maximum torque transmitted from the variable transmission to the clutch is generated.

In the related art, there is a need for a method of eliminating undesirable rollback when a vehicle is on an uphill slope, and the driver releases the brake pedal and releases or disengages the handbrake, but does not step on the accelerator pedal and torque is not immediately provided to the wheels of the vehicle.

SUMMARY OF THE INVENTION

Aspects of the present invention generally pertain to a control method for idling anti-rollback of a pure electric vehicle, which can be suitable for starting an electric vehicle at idle, and effectively prevents an electric vehicle on a slope from rolling back, and has a simple and quick processing procedure with a stable and reliable performance, and therefore the present invention is suitable for large-scale popularization.

In order to realize the above aims, embodiments of the control method for idling anti-rollback of a pure electric vehicle of the present invention are as follows:

In a specific embodiment of the control method for idling anti-rollback of a pure electric vehicle, wherein the pure electric vehicle has a vehicle controller, a motor controller, a motor, a brake pedal, a handbrake device, an accelerator pedal, and a power battery. The vehicle controller is connected with the motor controller, the brake pedal, the handbrake device, the accelerator pedal, and the power battery. The power battery is connected with the motor through the motor controller. The method is characterized in that the method comprises the following steps:

Determining whether or not an anti-rollback control is needed by the current state of the vehicle with the vehicle controller according to the brake pedal, the handbrake device, and the accelerator pedal, where:

If the anti-rollback control is needed, judging whether the working condition of the anti-rollback control is satisfied by the current states of the power battery, the motor controller, and the motor with the vehicle controller, where:

If not satisfied, controlling the motor controller with the vehicle controller to drive the motor to stop outputting a torque; and If satisfied, controlling the motor controller with the vehicle controller to drive the motor to output the torque for the anti-rollback control.

In a specific embodiment of the control method for idling anti-rollback of a pure electric vehicle, the step of determining whether an anti-rollback control is needed by the current state of the vehicle according to the brake pedal, the handbrake device and the accelerator pedal includes comprises the following steps:

Determining whether the electric vehicle is located on a slope or not with the vehicle controller, where:

If not, terminating the whole process; if yes, judging whether the handbrake device has been pulled down and the brake pedal is released or not with the vehicle controller;

If not, braking the vehicle, and terminating the whole process; if yes, judging whether the position of the accelerator pedal is larger than a preset reference position or not with the vehicle controller; and If yes, driving the vehicle normally, and terminating the whole process; if not, returning the result of needing the anti-rollback control.

In a specific embodiment of the control method for idling anti-rollback of a pure electric vehicle, the step of judging whether the working condition of the anti-rollback control is satisfied by the current states of the power battery, the motor controller, and the motor with the vehicle controller comprises the following steps:

Detecting whether the electric quantity state of the power battery is higher than a preset reference electric quantity state with the vehicle controller, where:

If not, returning the result of the working condition of the anti-rollback control being not satisfied;

If yes, detecting whether the temperature of the motor and the motor controller is lower than a preset reference temperature with the vehicle controller, where:

If not, returning the result of the working condition of the anti-rollback control being not satisfied; and If yes, returning the result of the working condition of the anti-rollback control being satisfied.

In a specific embodiment of the control method for idling anti-rollback of a pure electric vehicle, the power battery is a single battery, where before detecting whether the temperature of the motor and the motor controller is lower than a preset reference temperature with the vehicle controller, the method further comprises the following steps:

Detecting whether the voltage of the single battery is higher than a preset reference voltage with the vehicle controller, where:

If not, returning the result of the working condition of the anti-rollback control being not satisfied; and If yes, detecting whether the temperature of the motor and the motor controller is lower than a preset reference temperature with the vehicle controller, where:

If not, returning the result of the working condition of the anti-rollback control being not satisfied; and If yes, returning the result of the working condition of the anti-rollback control being satisfied.

In a specific embodiment of the control method for idling anti-rollback of a pure electric vehicle, the step of controlling the motor controller with the vehicle controller to drive the motor to output the torque for the anti-rollback control comprises the following steps:

Driving the motor with the motor controller to generate the amount of the torque required by the anti-rollback control;

Continuing to increase the amount of the torque from the motor, so as to slowly drive the vehicle forward; and Adjusting the amount of the torque with the vehicle controller, so as to maintain the idle speed of the vehicle.

With the control method for idling anti-rollback of a pure electric vehicle, the pure electric vehicle has a vehicle controller, a motor controller, a motor, a brake pedal, a handbrake device, an accelerator pedal and a power battery. The embodiments of methods of the present invention make clever use of the differences of the pure electric vehicle from conventional cars, and collects the states of individual parts of the vehicle through the vehicle controller, controls the output of the torque of the motor based on the state information of various control components, to prevent the vehicle located on a slope from rolling back, and makes the vehicle move forward at idle. Therefore the present invention can be suitable for the pure electric vehicle. As compared with conventional cars, the pure electric vehicle can use the motor alone to drive the vehicle, and therefore is very different from conventional cars in the control of the torque and the speed regulation. Thus the present invention can be suitable for starting an electric vehicle at idle, effectively prevents an electric vehicle on a slope from rolling back. Embodiments of the present invention have a simple and quick processing procedure, and a stable and reliable performance, and lays a solid foundation for further development and application of electric vehicle technology.

DETAILED DESCRIPTION OF THE PREFERRED EMBODIMENT

In order to clearly understand the technical content of the present invention, the present invention is further exemplified by reference to the following examples.

Figure 1:
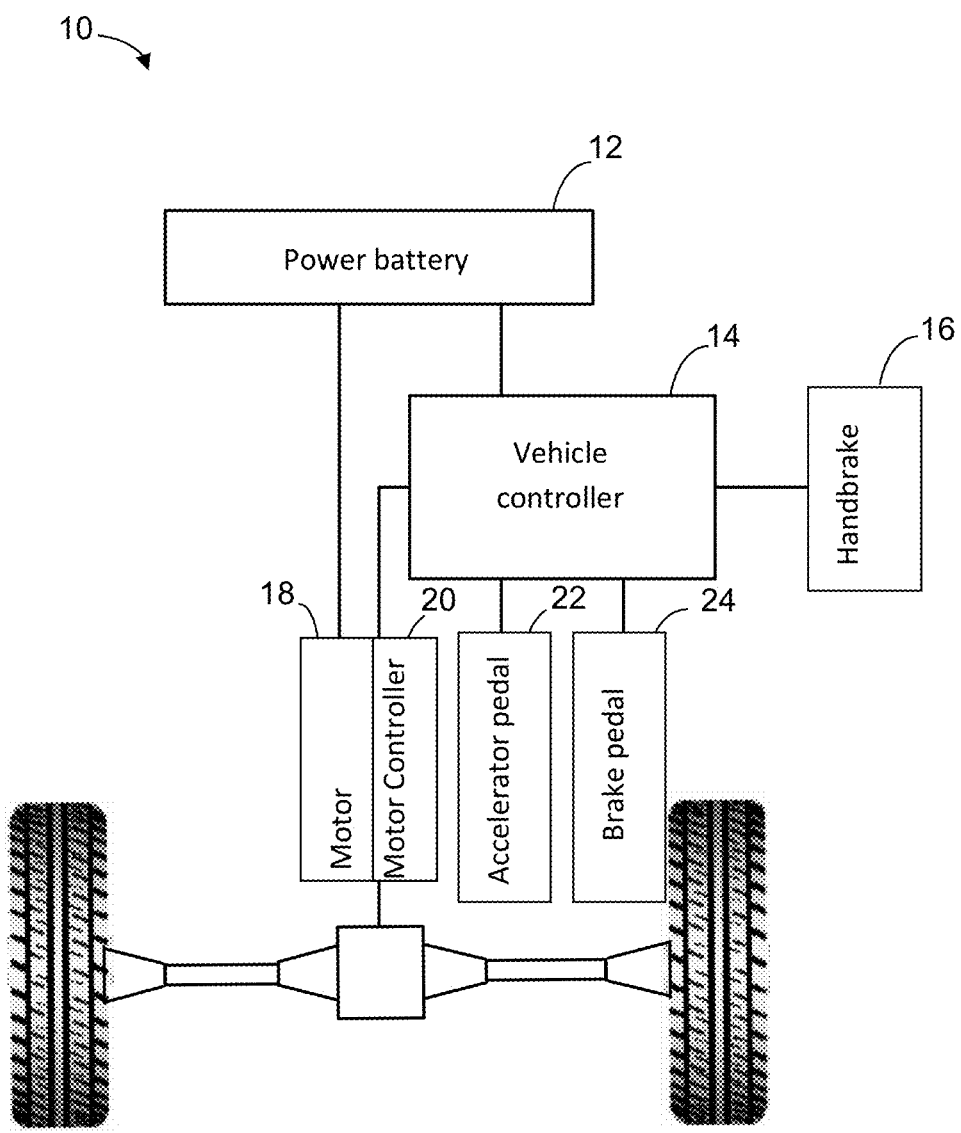
FIG. 1 is a schematic view of an embodiment of the structure of the functional modules of the pure electric vehicle of the present invention.
Figure 2:
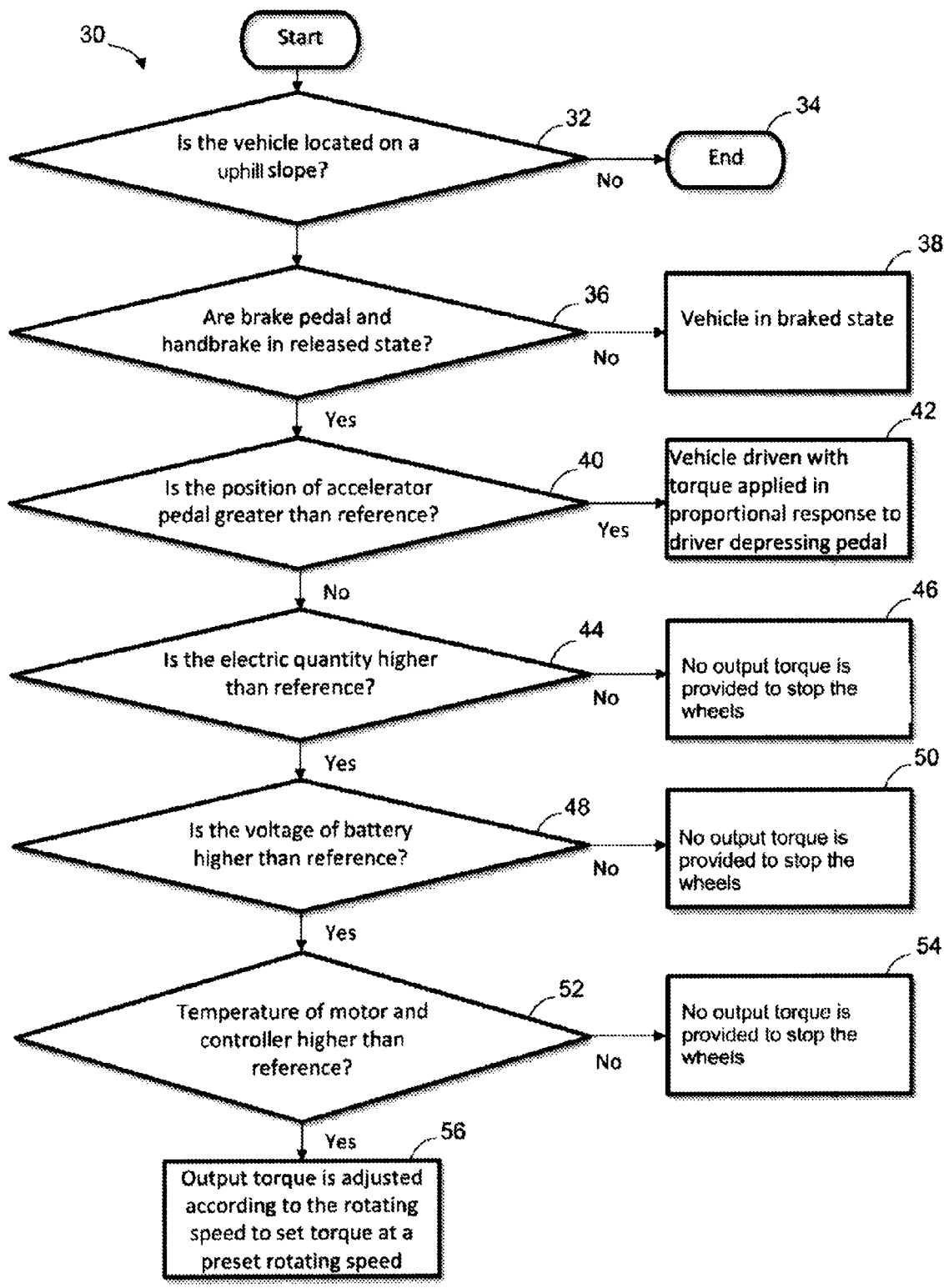
FIG. 2 is a flowchart of an embodiment of the control method for idling anti-rollback of pure electric vehicles of the present invention.

Please refer to FIGS. 1-2, for the control method for idling anti-rollback of pure electric vehicles, wherein the pure electric vehicle 10 has a vehicle controller 14, a motor controller 20, a motor 18, a brake pedal 24, a handbrake device 16, an accelerator pedal 22, and a power battery 12. The vehicle controller 14 is connected with the motor controller 20, the brake pedal 24, the handbrake device 16, the accelerator pedal 22, and the power battery 12. The power battery is connected with the motor 18 through the motor controller 20. The method is characterized in that the method comprises the following steps:

Determining whether or not an anti-rollback control is needed by the current state of the vehicle with the vehicle controller according to the brake pedal, the handbrake device, and the accelerator pedal, which comprises the following steps;

Determining whether the electric vehicle is located on a slope with the vehicle controller (Step 32), where:

If the electrical vehicle is not on a slope (Decision step 32 is No), terminating the whole process (Step 34), and if the electric vehicle is on a slope (Decision step 32 is Yes), judging whether the handbrake device has been pulled down (released) and the brake pedal is released with the vehicle controller (step 36);

If the handbrake device has not been pulled down (released) and the brake pedal is not released (Decision step 36 is No), braking the vehicle, and terminating the whole process (Step 38), if the handbrake device has been pulled down (released) and the brake pedal is released (Decision step 36 is Yes), judging whether the position of the accelerator pedal is larger than a preset reference position with the vehicle controller (Step 40);

If the position of the accelerator pedal is larger than a preset reference position (Decision step 40 is Yes), the vehicle is driven with torque applied in proportional response to driver depressing pedal (Step 42), and the whole process is terminated, and if the position of the accelerator pedal is less than a preset reference position (Decision step 40 is No), returning the result of needing the anti-rollback control, and judging whether the working condition of the anti-rollback control is satisfied by the current states of the power battery, the motor controller, and the motor with the vehicle controller (Steps 44, 48, and 52), which comprises the following steps:

Detecting whether the electric quantity state of the power battery is higher than a preset reference electric quantity state (Step 44) with the vehicle controller, where if the battery power is below the preset reference electric quantity state (Decision step 44 is No), and returning the result of the working condition of the anti-rollback control being not satisfied, and if the battery power is above the preset reference electric quantity state (Decision step 44 is Yes), detecting whether the temperature of the motor and the motor controller is lower than a preset reference temperature (Step 52) with the vehicle controller, wherein before detecting whether the temperature of the motor and the motor controller is lower than a preset reference temperature with the vehicle controller, the method further comprises the following steps:

Detecting whether the voltage of the single battery is higher than a preset reference voltage (step 48) with the vehicle controller, where if the voltage of the battery is below the preset reference (Decision step is No) the result of the working condition of the anti-rollback control being not satisfied is returned, and if the voltage of the battery is above the preset reference (Decision step 48 is Yes) detecting whether the temperature of the motor and the motor controller is lower than a preset reference temperature with the vehicle controller, where if the temperature of the motor and the motor controller is above a preset reference temperature (Decision step 52 is Yes), returning the result of the working condition of the anti-rollback control being not satisfied, and if the temperature of the motor and the motor controller is below the preset reference temperature (Decision step 52 is No) then returning the result of the working condition of the anti-rollback control being satisfied.

If the working condition of the anti-rollback control are not satisfied, controlling the motor controller with the vehicle controller to drive the motor to stop outputting a torque (Step 46, 50, 54), and if the working condition is satisfied, controlling the motor controller with the vehicle controller to drive the motor to output the torque for the anti-rollback control, which comprises the following steps:

Driving the motor with the motor controller to gradually generate the amount of the torque required by the anti-rollback control;

Continuing to gradually increase the amount of the torque from the motor, so as to slowly drive the vehicle forward;

Adjusting the amount of the torque gradually with the vehicle controller, so as to maintain the idle speed of the vehicle (Step 56).

In actual use, the control method for idling anti-rollback of a pure electric vehicle of the present invention, wherein the pure electric vehicle comprises a combined control of a vehicle controller (VCU), a motor controller (MCU), a motor, a brake pedal, a handbrake, an accelerator pedal and a power battery, and the method comprises the following steps:

Using the vehicle controller to determine the current state of the vehicle, whether there is a state of braking or a state of pulling up (releasing) the handbrake;

Using the motor to gradually produce the amount of the torque required for anti-rollback;

Continuing to increase the amount of the torque of the motor, to make the vehicle move forward slowly; and Using the vehicle controller to gradually regulate the amount of the torque to maintain the idle speed.

Wherein, the step of determining the state of the vehicle further comprises using the positions of the brake pedal and the handbrake to determine the current state of the vehicle, and determining the position of the accelerator pedal, to determine the driver's intention.

In embodiments of the invention, the vehicle controller is responsible for adjusting and controlling the torque of the vehicle, the vehicle further comprises a battery for supplying electric power to the motor, and the method further comprises the following steps:

Determining whether the electric quantity state of the power battery is higher than a preset reference electric quantity state, where:

If the electric quantity state of the power battery is higher than the preset reference electric quantity state, using the motor to produce the torque required, to prevent the vehicle from rolling back, and move the vehicle forward at idle, and If the electric quantity state of the power battery is lower than the preset reference electric quantity state, stopping outputting the torque.

Embodiments of the vehicle further comprises a single battery for supplying electric power to the motor, and the method further comprises the following steps:

Determining whether the electric quantity state of the single battery is higher than a preset reference electric quantity state, where If the electric quantity state of the single battery is higher than the preset reference electric quantity state, using the motor to produce the torque required, to prevent the vehicle from rolling back, and move the vehicle forward at idle, and If the electric quantity state of the single battery is lower than the preset reference electric quantity state, stopping the motor from outputting the torque.

Embodiments of the method further comprises the following steps:

Determining whether the temperature of the motor and the motor controller are lower than a preset reference temperature, where If the temperature of the motor is lower than the reference temperature, using the motor to produce the desired torque, to prevent the vehicle from rolling back, and move the vehicle forward at idle, and If the temperature of the motor is higher than the reference temperature. then the motor is stopped from outputting the torque.

The vehicle controller is responsible for collecting the state information of the battery, the motor and the motor controller.

Please refer to FIG. 1, the vehicle power system 10 comprises a vehicle controller 14, a motor controller 20, a motor 18, an accelerator pedal 22, a brake pedal 24, a handbrake 16 and a power battery 12. The vehicle controller 14 is responsible for collecting the working states of various control components, and determines the working mode of the motor 18 according to the working states of various components, and adjusts the motor 18 to output the torque, to prevent the vehicle on the slope from rolling back, and can move the vehicle forward at idle.

Then please refer to FIG. 2, which is a control flow for preventing an electric vehicle located on a steep slope from rolling back. When the electric vehicle is located on a slope, the vehicle controller first determines the intention of the driver, whether starting the vehicle is needed, i.e., judges whether the handbrake is pulled down (released), and whether the brake pedal is released, when the handbrake is still in the pulling up state (engaged) or the brake pedal is in the braking state, the vehicle controller stops outputting the torque, and maintains the current states, if the handbrake is in the pulling down state (released), and the brake pedal is in the releasing state, the vehicle controller judges the electric quantity state of the battery and the temperature situation of the motor and the motor controller, when the electric quantity of the battery is higher than the reference electric quantity, the single voltage is higher than the reference voltage, and the temperature of the motor and the motor controller is lower than the reference temperature, the motor is adjusted to output the torque, to prevent the vehicle from rolling back and move the vehicle forward at idle. Otherwise, the torque is stopped to output the torque, and a buzzing sound is made to remind the driver to brake the vehicle, so as to protect the motor and its controller, and the power battery.

In the stage of the vehicle controller adjusting the motor to output the torque, when the accelerator pedal exceeds the reference value, and the accelerator pedal is working, the controller exits the anti-rollback idling mode, and enters into the normal running mode.

In embodiments of the control method for idling anti-rollback of a pure electric vehicle, the pure electric vehicle has a vehicle controller, a motor controller, a motor, a brake pedal, a handbrake device, an accelerator pedal and a power battery, the method of the present invention makes clever use of the differences of the pure electric vehicle from conventional cars, collects the states of individual parts of the vehicle through the vehicle controller, controls the output of the torque of the motor based on the state information of various control components, to prevent the vehicle located on a slope from rolling back, and makes the vehicle move forward at idle. Therefore the present invention can be suitable for the pure electric vehicle. Compared with conventional cars, the pure electric vehicle can use the motor alone to drive the vehicle, therefore is very different from conventional cars in the control of the torque and the speed regulation. Thus the present invention can be suitable for starting an electric vehicle at idle, and effectively prevents an electric vehicle on a slope from rolling back. Embodiments of the inventive method provide a simple and quick processing procedure, and a stable and reliable performance, and lay a solid foundation for further development and application of the electric vehicle technology.

In the present specification, the present invention has been described according to the particular embodiments. But it is obvious that these embodiments can be modified or changed without departure from the spirit and scope of the present invention. Therefore, the specification and drawings described above are exemplary only and not intended to be limiting.

We claim:

1. An anti-rollback control method for idling a pure electric vehicle powered only by a power battery on an ascending slope, wherein the pure electric vehicle has a vehicle controller, a motor controller, a motor, a brake pedal, a handbrake device, an accelerator pedal and a power battery, where the vehicle controller is connected with the motor controller, the brake pedal, the handbrake device, the accelerator pedal and the power battery, and where the power battery is connected with the motor through the motor controller, the method comprising:

determining, by the vehicle controller, the electric vehicle is located on the ascending slope;

determining, by the vehicle controller, the handbrake device has been disengaged and the brake pedal released;

determining, by the vehicle controller, whether an anti-rollback control is needed based on a current state of the vehicle with the vehicle controller according to the brake pedal, the handbrake device, and the accelerator pedal;

when the anti-rollback control is needed, determining whether a working condition of the anti-rollback control is satisfied by a set of current states of the power battery, the motor controller, and the motor with the vehicle controller;

when the working condition of the anti-rollback control is not satisfied, controlling the motor controller with the vehicle controller to drive the motor to stop outputting an amount of torque;

when the working condition of the anti-rollback is satisfied, controlling the motor controller with the vehicle controller to drive the motor to output the amount of torque for the anti-rollback control;

driving the motor with the motor controller to generate the amount of the torque required by the anti-rollback control;

increasing the amount of the torque from the motor, so as to drive the vehicle forward; and adjusting the amount of the torque gradually with the vehicle controller, so as to maintain an idle speed of the vehicle.

2. The anti-rollback control method according to claim 1, characterized in that, the determining of whether the working condition of the anti-rollback control is satisfied by the set of current states of the power battery, the motor controller, and the motor with the vehicle controller comprises:

detecting whether an electric quantity state of the power battery is higher than a preset reference electric quantity state with the vehicle controller; and wherein when the electric quantity state of the power battery is lower than the preset reference electric quantity state, the working condition of the anti-rollback control is not satisfied.

3. The anti-rollback control method according to claim 2, wherein when the electric quantity state of the power battery is higher than the preset reference electric quantity state, the working condition of the anti-rollback control is satisfied, the anti-rollback control method further comprising:

detecting whether a temperature of the motor and the motor controller is lower than a preset reference temperature with the vehicle controller.

4. The anti-rollback control method according to claim 3, wherein when the temperature of the motor and the motor controller is lower than the preset reference temperature, the working condition of the anti-rollback control is satisfied.

5. The anti-rollback control method according to claim 3, wherein when the temperature of the motor and the motor controller is higher than the preset reference temperature, the working condition of the anti-rollback control is not satisfied.

6. The anti-rollback control method according to claim 1, wherein if the handbrake device has been disengaged and the brake pedal released with the vehicle controller, the anti-rollback control method further comprises:

determining whether the accelerator pedal is depressed beyond a preset reference position with the vehicle controller;

wherein when the accelerator pedal is depressed beyond the preset reference position, the vehicle is driven with torque applied in proportional response to a driver depressing the accelerator pedal; and wherein when the accelerator pedal is not depressed beyond the preset reference position, the anti-rollback control is applied by the vehicle controller.

7. The anti-rollback control method according to claim 1, wherein when the handbrake device is engaged and the brake pedal is pressed down the vehicle is in a braking state and the anti-rollback control method terminates.

* * * * *